United States Patent [19]

McCoy et al.

[11] 4,064,081

[45] Dec. 20, 1977

[54] EMULSION POLYMERIZATION IN THE PRESENCE OF LIGNOSULFONATE SALT

[75] Inventors: Robert H. McCoy, Cheshire; Woodrow W. White, Oxford, both of Conn.

[73] Assignee: Uniroyal, Inc., New York, N.Y.

[21] Appl. No.: 647,017

[22] Filed: Jan. 7, 1976

[51] Int. Cl.$^2$ .............................................. C08F 2/26
[52] U.S. Cl. ........................... 260/17.5; 260/29.6 SQ; 260/29.6 MQ; 260/29.7 SQ; 428/519; 428/520
[58] Field of Search ...... 260/17.5, 29.6 MG, 29.7 SQ, 260/29.6 SQ

[56] References Cited

U.S. PATENT DOCUMENTS

| | | | |
|---|---|---|---|
| 1,898,522 | 2/1933 | Bock et al. ...................... | 260/17.5X |
| 2,232,515 | 2/1941 | Arnold et al. ...................... | 260/84 |
| 2,354,210 | 5/1944 | Jacobson ............................ | 260/83 |
| 2,533,632 | 12/1950 | Salvesen et al. ................... | 260/17.5 |
| 2,577,390 | 12/1951 | Watson ............................... | 260/17.5 |

Primary Examiner—Harold D. Anderson
Assistant Examiner—E. A. Nielsen
Attorney, Agent, or Firm—James J. Long

[57] ABSTRACT

Polymer latex (e.g., butadiene-styrene-itaconic acid copolymer latex) resulting from aqueous emulsion polymerization in the presence of conventional anionic emulsifying agent (e.g., dodecyl benzene sulfonate) has increased particle size and improved stability if a lignosulfonate salt (e.g., sodium lignosulfonate) is further employed as an emulsion modifier in the emulsion polymerization process. The resulting latex is useful for carpet scrim application.

20 Claims, No Drawings

EMULSION POLYMERIZATION IN THE PRESENCE OF LIGNOSULFONATE SALT

This invention relates to an emulsion polymerization process and to a latex obtained by such process.

In the manufacture of polymer latexes by conventional emulsion polymerization processes it sometimes happens that the latex is not as stable as would be desirable. Insufficient stability of the latex in the emulsion polymerization reactor can lead to undesirable formation of coagulum in the reactor during the polymerization, or troublesome and wasteful coagulum can be formed during processing, storage or shipment of the latex. Furthermore, the behavior of the latex during compounding or in use, for example in carpet scrim application, is adversely affected if the latex is not sufficiently stable. Particular difficulty can arise in the case of polymerizations involving an acid (carboxyl) monomer where the polymerization is carried out at a low pH for optimum incorporation of the acidic monomer into the polymer. In this case the commercially available anionic surfactants conventionally employed usually initiate too many particles and lead to latex instability.

It will be understood that the stability of a latex is related to the surface area of the polymer particles in the latex and the amount of surfactant present, among other things. Large surface area is provided by small particles and is ordinarily associated with less stability than smaller surface area resulting from large particles of polymer, other factors being equal. There is also a relationship between particle size and the rate of polymerization, particularly as influenced by the emulsifying agent in a given emulsion polymerization recipe. Thus, conventional emulsifying agents frequently favored in emulsion polymerization recipes which give a rapid initiation of polymerization will also inherently produce a large number of initial polymer particles; the particle size in the final latex will be small, surface area will be large, and stability will tend to be poor. Use of a larger quantity of such an emulsifying agent in the recipe does not result in a stable latex; it simply causes still more rapid initiation with formation of still more particles (and consequently smaller particles with larger surface area). Reducing the level of such an emulsifying agent does not remedy the situation because even at reduced levels the initiation rate is still so high that more particles are formed than can be adequately stabilized by the amount of emulsifying agent present.

The present invention is based on the unexpected discovery that the use of a lignosulfonate salt as an emulsion modifier, in an otherwise conventional emulsion polymerization recipe based on an anionic emulsifying agent, results in a latex having remarkably larger average particle size with surprisingly improved stability. As a consequence of the presence of the lignosulfonate salt the rate of initiation of polymerization appears to be reduced, with apparent formation of fewer polymer particles. The resulting improvement in stability is achieved, surprisingly, at excellent polymerization rates.

The invention is applicable to the emulsion polymerization of any monomer (including combinations of monomers) conventionally polymerized (in which term we include copolymerized) by an emulsion process to form a polymer latex. Such monomers include polymerizable compounds having a single ethylenic double bond such as the vinyl aromatic compounds (especially styrene, alpha-methyl styrene, vinyl pyridine), esters (ethyl acrylate, methyl methacrylate, etc.), acids (acrylic acid, methacrylic acid, ethacrylic acid), vinyl acetate, and the like, as well as compounds having more than one ethylenic double bond as in the conjugated diolefins such as butadiene, isoprene, chloroprene, etc. Of particular interest are copolymers (in which term we include interpolymers containing two or more monomers) of a conjugated diene such as butadiene or isoprene with at least one copolymerizable monoethylenically unsaturated compound such as styrene, alpha-methyl styrene, acrylonitrile, methacrylonitrile, alkyl acrylates or methacrylates, vinyl acetate, etc. Particularly preferred are such copolymers in which as least one of the monoethylenically unsaturated monomers has carboxyl functionality, whether a monocarboxylic acid or a polycarboxylic (e.g., dicarboxylic) acid, such as itaconic acid, acrylic acid, methacrylic acid, fumaric acid, citraconic acid, maleic acid, ethyl acid maleate, etc. Examples of suitable copolymers are butadiene-styrene copolymer, butadiene-acrylic acid copolymer, isoprene-styrene-itaconic acid copolymer, etc. In many cases the copolymers contain a conjugated diolefin (e.g., butadiene) and two copolymerizable monoethylenically unsaturated monomers, one of which is a vinyl aryl monomer (e.g., styrene) and the other of which is a carboxylic acid. Latexes of polymers containing such carboxyl functionality are commonly referred to as carboxylated latexes or acid latexes.

As is well understood by those skilled in the art, emulsion polymerizations are conventionally carried out by agitating the monomer or monomers to be polymerized in an aqueuos medium in a closed vessel in the presence of an emulsifying agent, an emulsion polymerization catalyst and ordinarily a polymerization regulator such as a chain transfer agent. In addition various other optional emulsion polymerization ingredients may be included such as a chelating agent, retarder or inhibitor if desired. Frequently the emulsion polymerization process is conducted at temperatures of from 5° to 80° C. The process may be conducted batchwise or continuously; the monomer(s) or various other ingredients may be introduced incrementally in appropriate cases if desired. Ordinarily a reaction time of from about 10 to 30 hours is sufficient to bring about substantial conversion of monomers to polymer.

As indicated, the present invention differs from conventional practice in that there is employed, along with a conventional anionic emulsifying agent, an emulsion modifier which is a lignosulfonate salt. The lignosulfonate salt emulsion modifier apparently serves to control the rate of initiation of particles by the primary surfactant (anionic emulsifying agent). As a result, the polymer latex which is produced has a larger particle size than would be expected without the lignosulfonate present. Such particles may range from 500 to 5,000 Angstroms (average diameter as determined by turbidity measurements), preferably from 1,000 to 3,000 Angstroms. Such large particle size latex has improved stability, compared to an otherwise similar latex made with the primary surfactant (anionic emulsifying agent) alone and in the absence of the lignosulfonate salt emulsion modifier of the invention.

The lignosulfonate salt emulsion modifiers employed in the invention are known surface-active materials. Their chemistry is discussed in some detail in: The Chemistry of Lignin by Ervin A. Pearl New York — M. Dekker 1967, a bulletin entitled "Lignosol" (trademark) issued by Lignosol Chemicals and a bulletin entitled "Chemicals from Wood" published by American Can Company as their Bulletin No. 131 as well as a booklet "The Orzan [trademark] Products" published by Crown Zellerbach. These materials are by-products of the sulfite liquor from the pulp making process and are mixtures of sulfonated lignin, polysaccharides and wood sugars. They can be modified through removal of sugars, conversion to various salt forms and by hydrolysis and polymerization. However, for purposes of the invention the unmodified products may be used as well as the modified products.

Typical properties of various types of lignosulfonates commercially available under the trademark "Lignosol" are given in Table I, wherein HCX, SFX and D-30 are sodium salts and BD is a calcium salt. These salts are employed in the working examples below.

TABLE I

Typical Analytical Data for Lignin Sulfonates

| Lignosol: | HCX | SFX | D-30 | BD |
|---|---|---|---|---|
| Time as CaO, % | 0.25 | 0.4 | nil | 6.0 |
| Ash, % | 35.0 | 27.0 | 24.7 | 10.0 |
| Total sulfur, % | 3.2 | 5.0 | 4.6 | 5.0 |
| Sulfonate sulfur, % | 2.9 | 3.4 | 2.9 | 3.5 |
| pH | 10.0 | 6.8 | 10.3 | 4.6 |
| Solution, % | 30 | 50 | 27 | 50 |
| Insolubles (27% soln) | 2 | 3 | 0.1 | 0.2 |
| Methoxyl, % | 6.0 | 6.9 | 6.7 | 7.6 |
| Sodium as Na, % | — | — | — | 0.0 |

The lignosulfonate salt employed to modify the emulsion in the invention may be any water soluble salt of lignosulfonic acid formed with any cation such as a metal, especially an alkali metal such as sodium, potassium or lithium or alkaline earth metal such as calcium or barium, as well as aluminum, magnesium, or with ammonia or an amine, as in the lower alkyl, hydroxyalkyl or alkoxy amines (e.g., methylammonium, hydroxyethylammonium, dimethylhydroxyethylammonium), aromatic amines, or equivalent heterocyclic amines such as morpholine (morpholinoammonium). Of particular interest are salts of ammonium, alkali metals, alkaline earth metals and elements in Group IB and IIB of the Periodic Table. Frequently such a salt may be characterized as a lignosulfonic acid salt with an alkali metal cation, a quaternary ammonium cation, a quaternary phosphonium cation, or a primary, secondary, or tertiary organic base cation.

Any conventional anionic emulsifying agent as ordinarily used in emulsion polymerization processes is suitable for use in this invention along with the lignosulfonate salt emulsion modifier. The conventional anionic emulsifying agents are discussed for example in such standard works as "High Polymer Latices" by D. C. Blackley, Vol. 1, pages 98-107 and "Encyclopedia of Surface Active Agents" by Sisley and Wood, pages 33-35. Typical anionic emulsifying agents include the alkyl sulfonates, sulfonated betaine derivatives, diphenyl sulfonates, sulfo-derivatives of succinates, alcohol sulfates, ethoxylated alcohol sulfates, sulfates and sulfonates of ethoxylated alkyl phenols, sulfonates of alkaryls, including dodecyl and tridecylbenzene sulfonates, sulfonates of benzene, toluene and xylene, sulfonates of condensed naphthalens, sulfonates of dodecyl and tridecylbenzenes, sulfonates of naphthalene and alkylnaphthalenes. Especially preferred are alkylaryl sulfonates, alpha-olefin sulfates, sodium salts of higher alkylsulfates, and sodium salts of alkyl- or cycloalkyl substituted sulfosuccinates.

The amount of lignosulfonate salt employed as emulsion modifier along with the anionic emulsifying agent in practicing the invention is suitably from 0.1 to 6 parts be weight, preferably from 0.2 to 5 parts by weight, most preferably from 0.5 to 3 parts by weight, per 100 parts by weight of monomer present.

The levels of anionic emulsifier may be reduced from their ordinary 3-6 parts to about 0.1 - 3 parts, usually 0.5 to 1.5 parts, per 100 parts by weight of total monomer present.

As indicated, the emulsion polymerization recipe may further include if desired other conventional ingredients such as polymerization retarders or inhibitors (e.g., nitrobenzene, nitrosobenzene, benzoquinone, triphenylmethane, etc.) chain transfer agents (e.g., mercaptans, carbon tetrachloride, tetrachloroethane, etc.). Chelating agents, especially those of the aminopolycarboxylic acid and the hydroxycarboxylic acid types, are frequently employed in order to effectively remove any trace metals in the system that might adversely influence the polymerization e.g., activation of catalyst by iron.

A preferred practice of the invention is directed to the production of carboxylated latex as described above, in an aqueous emulsion polymerization medium having a pH of from 2 to 6, usually 2 to 3.5, during polymerization; upon completion of the polymerization the reactor contents are normally neutralized.

The particle size of the latex may be estimated from turbidity measurements, in accordance with known practice. The turbidity may be determined according to the following procedure: A 1.0 g ($\pm$ 0.2 mg) sample of latex is placed in a 100 ml volumetric flask using an analytical balance. 30 ml of distilled water are added immediately after weighing and additional water is introduced to bring total volume to 100 ml. 5 ml of the above diluted latex are transferred via a pipette to another 100 ml volumetric flask to which 95 ml of distilled water are charged. The contents of the second flask are mixed thoroughly, and an aliquot is placed in a 1 cm (35 0.01 cm) silica cell. The cell is mounted in a Beckman DU [trademark] spectrophotometer, and the optical density is determined using a slit width of 1.5 at a 700 millimicron wavelength. The turbidity (T) value is calculated using the following equation $$T = \frac{OD \times 1000}{(W) \times (S) \times (A)}$$

wherein
OD = optical density
W = sample weight
S = weight % solids of sample
A = aliquot, ml The list below indicates typical turbidity versus particle size (Angstrom, A) relationships:

| T | Particle Size, A |
|---|---|
| 0.04 | 500 |
| 01 | /080 |
| 0.5 | 1400 |
| 1.0 | 1940 |
| 1.8 | 2500 |

Generally the emulsion polymerization is carried out according to the following steps: water as well as aqueous solutions of catalyst (5%), emulsifier (10%), emulsion modifier (10%), chelating agent (sodium salt of ethylenediaminetetracetic acid, EDTA) (1%), and acid functionality containing monomer (e.g., itaconic acid, 5%, all by weight) are charged to the reactor. After these water-soluble ingredients, a chain transfer agent (e.g., t-dodecylmercaptan) and monomers (e.g., butadiene, styrene) are introduced. When carrying out small scale (bottle) polymerizations it is customary to charge about 5% excess of butadiene which is subsequently allowed to evaporate for the purpose of flushing out residual air in the reactor. Thereafter the bottle is closed with a cap equipped with a self-sealing gasket allowing removal of samples using a hypodermic needle. The reactor is then heated to the desired polymerization temperature, and the contents are suitably agitated. The polymers obtained according to this invention generally exhibit 2 or less percent coagulum, preferably less than 1 percent, and most preferably have negligible or no coagulum.

The following examples, in which all quantities are expressed by weight, will serve to illustrate the practice of the invention in more detail.

EXAMPLE I

Runs 1-16

A butadiene-styrene-itaconic acid terpolymer is prepared according to the general procedure outlined above using the following recipe: 200 ml of distilled water (minus the amounts of water used for ingredient solutions), as well as (aqueous solutions of; see above) catalyst ($K_2S_2O_8$, as amounts indicated in Table II, wherein "phM" stands for parts per 100 parts by weight of monomer), emulsifier (sodium salt of linear alkylbenzene sulfonate wherein the alkyl group has an average of 12 carbon atoms; Biosoft-100 [trademark], see Table II variations), sodium lignosulfonate emulsion modifier (Lignosol; see Table II modifications, for analytical data on the various Lignosols, see Table I), EDTA (0.1 g) and itaconic acid (see variable amounts, Table II) are introduced into the polymerization bottle. Thereafter T-dodecylmercaptan (0.3 g) chain transfer agent, and butadiene and styrene (at amounts indicated in Table II) are charged to the bottle. After venting an about 5 percent excess of butadiene, added in order to remove residual air, the bottle is closed with a cap having a self-sealing gasket and placed in a 60° C. bath wherein the bottle is rotated end-over-end at 7 RPM for the time period indicated in Table II. Samples are taken after 16 hours of polymerization, and the average polymerization rate is determined as percent conversion per hour on the basis of percent solids at 16 hours (the 6.25% results are to be considered minimum values at time because the actual time [less than 16 hours] to 100% conversion is not known). The total polymerization period is not extended beyond 22½ hours. The results in Table II, Part I and Part II, indicate that the latexes produced have exceptionally large particle size with high conversion and good latex stability. No coagulum is formed above an acceptable 2 percent level, and in most instances the amount of coagulum is either negligible (less than 0.05 %) or non-existent (in Table II "negl." indicates less than 0.05% coagulum).

| | | | | | TABLE II, Part I Latex Polymerization | | | | | | |
|---|---|---|---|---|---|---|---|---|---|---|---|
| Run No | 1 | 2 | 3 | 4 | 5 | 6 | 7 | 8 | 9 | 10 | 11 |
| Monomers | | | | | | | | | | | |
| Butadiene | 67.5 | → | → | → | → | → | → | → | → | → | → |
| Styrene, g | 81. | → | → | → | → | → | → | → | → | → | → |
| Itaconic acid, g | 2 | → | → | → | → | → | → | → | → | → | → |
| Catalyst | | | | | | | | | | | |
| $K_2S_2O_8$, g | 1.0 | 1.5 | 2.0 | 2.0 | 1.0 | 1.5 | 1.5 | 2.0 | 2.0 | 2.5 | 2.5 |
| $K_2S_2O_8$, phM | 0.6 | 1.0 | 1.33 | 1.33 | 0.66 | 1.0 | 1.33 | 1.33 | 1.33 | 1.67 | 1.67 |
| Emulsifier | | | | | | | | | | | |
| Biosoft-100, g | 1.6 | 1.2 | 0.8 | 1.6 | 2.2 | 2.0 | 2.4 | 1.8 | 2.2 | 1.0 | 1.5 |
| Biosoft-100, phM | 1.07 | 0.8 | 0.53 | 1.07 | 1.46 | 1.33 | 1.6 | 1.2 | 1.46 | 0.67 | 1.0 |
| Emulsion Modifier | | | | | | | | | | | |
| Lignosol HCX, g | 1.0 | 2.0 | 1.0 | 1.0 | — | — | — | — | — | — | — |
| Lignosol D30, g | — | — | — | — | 3.0 | 4.0 | 2.0 | 1.0 | 3.0 | 1.6 | 3.2 |
| Lignosol BD, g | — | — | — | — | — | — | — | — | — | — | — |
| Lignosol phM | 0.66 | 1.33 | 0.66 | 0.66 | 2.0 | 2.67 | 1.33 | 0.66 | 2.0 | 1.07 | 2.14 |
| Reaction time, hrs. | 16 | 20 | 22 | 16 | 16 | 22 | 16 | 16 | 16 | 22½ | 22½ |
| Conversion, % | 100 | 100 | 94 | 100 | 100 | 100 | 100 | 100 | 100 | 100 | 93 |
| Conversion rate, %/hr. | 6.25 | 4.06 | 3.71 | 6.25 | 6.25 | 3.88 | 6.25 | 6.25 | 6.25 | 2.95 | 3.7 |
| Turbidity | 0.85 | 1.57 | 2.08 | 0.92 | 2.33 | 2.61 | 1.97 | 2.19 | 2.39 | 3.10 | 2.64 |
| Particle size, A | 1900 | 2300 | >2500 | 2000 | >2500 | >2500 | 2500 | >2500 | >2500 | >2500 | >2500 |
| Coagulum, % | <0.25 | negl. | 1.73 | negl. | negl. | negl. | negl. | negl. | 0 | negl. | negl. |

| | TABLE II, Part II Latex Polymerization | | | | |
|---|---|---|---|---|---|
| Run No. | 12 | 13 | 14 | 15 | 16 |
| Monomers | | | | | |
| Butadiene | 60 | → | → | → | |
| Styrene, g | 88.5 | → | → | → | |
| Itaconic acid, g | 4 | 6 | 8 | 2 | 6 |
| Catalyst | | | | | |
| $K_2S_2O_8$, g | 1.5 | 2.0 | 1.5 | 1.0 | 2.0 |
| $K_2S_2O_8$, pbM | 0.99 | 1.32 | 0.99 | 0.66 | 1.32 |
| Emulsifier | | | | | |
| Bisoft-100, g | 2.2 | 1.8 | 2.0 | 1.6 | 1.6 |
| Bisoft-100, phM | 1.45 | 1.18 | 1.32 | 1.05 | 1.05 |
| Emulsion Modifier | | | | | |
| Lignosol HCX, g | — | — | — | — | — |
| Lignosol D30, g | 2.0 | 1.0 | 2.0 | — | — |
| Lignosol BD, g | 1.32 | 0.66 | 1.32 | 0.99 | 0.99 | continued

| | | | | | | |
|---|---|---|---|---|---|---|
| Reaction time, hrs. | 16 | 16 | 16 | 22 | | 20 |
| Converion, % | 100 | 100 | 100 | 100 | | 100 |
| Conversion rate, %/hr. | 6.25 | 6.25 | 6.25 | 4.10 | | 4.26 |
| Turbidity | 1.99 | 1.88 | 1.68 | — | | 2.20 |
| Particle size, A | >2500 | 2500 | 1700 | — | | >2500 |
| Coagulum, % | negl. | negl. | negl. | 1.7 | | negl. |

EXAMPLE II

Runs 17–20

Latex polymerizations are conducted as in Example I except for the variations indicated in Table III. These runs are outside of this invention and demonstrate that the use of the lignosulfonate emulsion modifier alone (Runs 17 and 18, Lignosol SFX, sodium lignosulfonate; analytical data in Table I) does not provide latexes at acceptable polymerization rates in the absence of the anionic emulsifier (in Runs 17 and 18 conversion rate, tubidity [particle size] and coagulum were not determined due to low conversion). Employing an emulsifier at levels generally suitable for the purpose of this invention but in the absence of the emulsion modifier (Runs 19 and 20) results, at good rates of conversion, in latexes having low particle size and/or poor latex stability (coagulum above 2 percent). In the case of Run 19 a particle size of 900 A is achieved but only with an unacceptably high amount of coagulum indicating latex instability.

TABLE III

| | Latex Polymerization | | | |
|---|---|---|---|---|
| Run No. | 17 | 18 | 19 | 20 |
| Monomers | | | | |
| Butadiene, g. | 30 | 30 | 67 | 60 |
| Styrene, g | 89 | 89 | 81 | 88.5 |
| Itaconic acid, g | 2 | 2 | 2 | 4 |
| Catalyst | | | | |
| $K_2S_2O_8$, g | 2.5 | 2.5 | 1.5 | 1.5 |
| $K_2S_2O_8$, phM | 2.06 | 2.06 | 1.0 | .99 |
| Emulsifier | | | | |
| Biosoft 100, g | — | — | 2.0 | 2.0 |
| biosoft 100, phM | — | — | 1.33 | 1.32 |
| Emulsion Modifier | | | | |
| Lignosol SFX, g | 2 | 4 | — | — |
| Lignosol SFX, phM | 1.65 | 3.3 | — | — |
| Reaction time, hrs. | 40 | 40 | 16 | 16 |
| Conversion, % | 39 | 24 | 100 | 100 |
| Conversion rate, %/hr | — | — | 6.25 | 6.25 |
| Turbidity | — | — | 0.19 | — |
| Particle size, A | — | — | 900 | — |
| Coagulum, % | — | — | 2.3 | 13.3 |

EXAMPLE III

Runs 21–23

This example demonstrates the wide variety of anionic emulsifiers suitable for carrying out the invention. The latex polymerizations are conducted essentially as Example I except for different levels of monomers, catalyst, emulsifiers and sodium lignosulfonate emulsion modifier (Lignosol D-30) as outlined in Table IV. The emulsifiers employed are characterized as follows: Lakeway (trademark) 301 is an alpha-olefinsulfonate, a 43 percent water solution thereof having a specific gravity of 1.07 at 24° C.; Dupanol (trademark) WAQ, is sodium laurylsulfate; and Aerosol (trademark) A-196 is sodium dicyclohexyl sulfosuccinate.

The polymerization periods on all runs are limited to 16 hours because the initiation stage is the most critical with regard to latex stability and conversion rate. Table IV indicates that stable latexes are produced within a wide range of polymerization rates. The relatively slower rates of conversion of Runs 22 and 23 indicate exceptionally high particle sizes (i.e., greater than 2300 A).

TABLE IV

| | Latex Polymerization | | |
|---|---|---|---|
| Run No. | 21 | 22 | 23 |
| Monomers | | | |
| Butadiene, g | 60 | 60 | 60 |
| Styrene, g | 88.5 | 88.5 | 88.5 |
| Itaconic acid, g | 2 | 2 | 2 |
| Catalyst | | | |
| $K_2S_2O_8$, g | 2.5 | 2.5 | 2.5 |
| $K_2S_2O_8$, phM | 1.65 | 1.65 | 1.65 |
| Emulsifier | | | |
| Lakeway 301, g | 2.0 | — | — |
| Dupanol WAQ, g | — | 2.0 | — |
| Aerosol A-196, g | — | — | 2.0 |
| Emulsifier, phM | 1.32 | 1.32 | 1.32 |
| Emulsion Modifier | | | |
| Lignosol D-30, g | 1.6 | 4.8 | 1.6 |
| Lignosoh, phM | 1.05 | 3.2 | 1.05 |
| Reaction time, hrs. | 16 | 16 | 16 |
| Conversion, % | 100 | 71 | 46.5 |
| Conversion rate, %/hr. | 6.25 | 4.3 | 2.9 |
| Coagulum, % | negl. | negl. | negl. |

EXAMPLE IV

Runs 24–26

Various lignosulfonate emulsion modifiers are evaluated in this example demonstrating the applicability of a broad range of lignosulfonates for the purpose of this invention. The polymerizations are carried out as in Example I except for the variations noted in Table V. The modifier SFX is identified on Table I above; HCX-65 is essentially the same as HCX in Table I, except for lower wood sugar content; D-70 is essentially the same as HCX-65 except for lower phenolic content.

All the resultant latexes have acceptable coagulum levels at good conversion after 16 hours. None of the polymerizations are extended beyond the 16 hours limit for the same reasons as in Example III.

TABLE V

| | Latex Polymerization | | |
|---|---|---|---|
| Run No. | 24 | 25 | 26 |
| Monomers | | | |
| Butadiene, g | 60 | 60 | 60 |
| Styrene, g | 88.5 | 88.5 | 88.5 |
| Itaconic acid, g | 2 | 2 | 2 |
| Catalyst | | | |
| $K_2S_2O_8$, g | 2.5 | 2.5 | 2.5 |
| $K_2S_2O_8$, phM | 1.65 | 1.65 | 1.65 |
| Emulsifier | | | |
| Biosoft-100, g | 2.0 | 1.50 | 1.0 |
| Biosoft-100, phM | 1.33 | 1.0 | 0.67 |
| Emulsion Modifier | | | |
| Lignosol HCX-65, g | 1.6 | — | — |
| Lignosol SFX, g | — | 3.2 | — |
| Lignosol D-70, g | — | — | 4.8 |
| Modifier, phM | 1.06 | 2.0 | 3.2 |
| Reaction time, hrs. | 16 | 16 | 16 |
| Conversion, % | 97 | 74 | 100 |
| Conversion rate, %/hr. | 6.1 | 4.6 | 6.25 |
| Coagulum, % | 1.0 | 2.0 | 0.02 |

EXAMPLE V

This example demonstrates the feasibility of scaling up the process of this invention: A 20 gal. autoclave, equipped with means to control temperature and pressure and with an agitator, is purged with butadiene and evacuated. Then, at room temperature, a solution of 1.98 kg of a 16% solution of Biosoft-100 emulsifier, 0.36 kg tetrasodium ethylenediaminetetraacetic acid and 0.25 kg Lignosol BD emulsion modifier in 9.1 kg of de-ionized water is introduced into the reactor. Chain transfer agent (t-dedecylmercaptan, 0.55 kg) is dissolved in 14.8 kg of styrene, and the solution is transferred into the reactor, followed by a 0.36 kg of itaconic acid in 9.1 kg of water (heated to 46° C.) solution. The catalyst ($K_2S_2O_8$; 0.36 kg) is dissolved in 14.5 kg of water and the mixture charged to the reactor. In addition, 12.3 kg of butadiene is charged, agitation (200 RPM) is started, and the reactor is heated to 60° C. After about 6 hours the solids content has reached 16.1 % and 0.55 kg of chain transfer agent in 0.1 kg of styrene is added. After 16 hours of polymerization (solids content about 30%) another 0.55 kg of t-dodecylmercaptan in 2.45 kg of styrene is charged as followed immediately by the introduction of another 2.04 kg of butadiene. 1 hour later styrene (2.45 kg) and butadiene (2.04 kg) are added. After 20½ hours of polymerization the reaction temperature is raised to 71° C. and agitation is set for 175 RPM. Having reached a total solids content of 46.7% (conversion 94.3%) after 26 hours, 2.9 kg of an aqueous 10% NaOH solution is slowly added to the reactor in order to neutralize the latex, and the resultant product is removed from the reactor while filtering. The latex has 11.0g (0.03%) of coagulum and a turbidity value of 2.18 indicating excellent stability and large (about 2500 A) particle size.

EXAMPLE VI

A styrene-butadiene-itaconic acid (34/40/1 parts) rubber latex prepared according to Run 10 containing negligible coagulum and a particle size greater than 2500 A (turbidity 3.10) is used for carpet backing. The latex is compounded employing the recipe below

| Latex (ca. 50% solids) | 200. | parts |
|---|---|---|
| Tetrasodium pyrophosphate | 0.75 | " |
| Antioxidant[1] emulsion (active) | 0.5 | " |
| Calcium carbonate | 350. | " |
| Polyacrylate thickener[2] | 7. | " |

[1]Mixture of 2,2'-methylenebis(4-methyl-6-nonylphenol) and 2,6-bis(2-hydroxy-3-nonyl-5-methylbenzyl)-p-cresol.
[2]Paragum (trademark) 104 sodium polyacrylate thickener commercially available as a 13% solids aqueous solution.

The compounded latex has a Brookfield viscosity of 11,800 centipoises at room temperature (Spindle #5 at 20 RPM). The latex is applied to the back of a polypropylene woven screen (tufted with nylon fiber) by means of a doctor blade. Subsequently a secondary backing (woven jute scrim) is rolled onto the latex layer under slight pressure, and the laminate is dried for 20 minutes at 125°–150° C. By means of a tensile tester the adhesion of the secondary backing to the tufted portion is measured (13 psi/linear 3 inches), indicating the exceptional suitability of the latex prepared according to this invention for carpet application.

We claim:

1. An improved emulsion polymerization process for preparing a polymer latex comprising polymerizing an emulsion polymerizable ethylenically unsaturated monomeric material in an aqueous medium in the presence of an emulsion polymerization catalyst for said monomeric material, and in the presence of an anionic principal emulsifying agent, the improvement comprising including a water-soluble lignosulfonate salt as an emulsion modifier.

2. The process of claim 1, wherein said lignosulfonate salt is present in an amount of from 0.1 to 6 parts, and said principal emulsifier is present in an amount of from 0.1 to 3 parts, per 100 parts by weight of the said monomeric material, the resulting latex having an average particle size of from 500 to 5,000 Angstroms.

3. The process of claim 1, wherein the emulsion polymerization is conducted at a temperature of from 5° to 80° C.

4. The process of claim 1, wherein said monomeric material includes a monomer having carboxylic funtionality.

5. The process of claim 4, wherein the emulsion polymerization is conducted at a pH of from 2 to 6.

6. An emulsion polymerization process for preparing a rubber latex comprising agitating, at a temperature of from 5° to 80° C, a mixture of water and monomeric material selected from conjugated dienes with or without at least one copolymerizable monoethylenically unsaturated monomer, in the presence of an emulsion polymerization catalyst for said monomeric material in an amount effective to catalyze the polymerization of said monomeric material, and in the presence of from 0.1 to 6 parts, per 100 parts by weight of said monomeric material, of a water-soluble lignosulfonate salt as an emulsion modifier, and from 0.1 to 3 parts, per 100 parts by weight of said monomeric material, of a different anionic principal emulsifying agent, resulting in a stable rubber latex having a particle size of from 500 to 5,000 Angstroms average diameter as determined by turbidity measurement.

7. The process of claim 6, wherein said monomeric material comprises a mixture of a conjugated diene, a copolymerizable vinyl aryl monomer and a copolymerizable ethylenically unsaturated carboxylic acid, the pH of the polymerization mixture during the said process being from 2 to 6.

8. The process of claim 7, wherein said conjugated diene is butadiene, said vinyl aryl monomer is styrene, and said carboxylic acid is itaconic acid.

9. The process of claim 6, wherein said lignosulfonate salt is an alkali metal or alkaline earth metal lignosulfonate.

10. The process of claim 6, wherein said anionic principal emulsifying agent is sodium dodecylbenzenesulfonate.

11. The process of claim 6, wherein said anionic principal emulsifying agent is an alpha-olefinsulfonate.

12. The process of claim 6, wherein said anionic principal emulsifying agent is sodium laurylsulfate.

13. The process of claim 6, wherein said anionic principal emulsifying agent is sodium dicyclohexylsulfosuccinate.

14. The process of claim 6, wherein said lignosulfonate salt is sodium lignosulfonate.

15. The process of claim 6, wherein said lignosulfonate salt is calcium lignosulfonate.

16. An emulsion polymerization process for preparing a rubber latex comprising agitating, at a temperature of from 5° to 80° C, a mixture of water and monomeric material comprising a conjugated diene, a copolymerizable vinyl aryl monomer and a copolymerizable monoethylenically unsaturated carboxylic acid, at a pH of 2 to 3.5, in the presence of an emulsion polymerization catalyst for said monomeric material in an amount effective to catalyze the polymerization of said monomeric material, and in the presence of from 0.2 to 5 parts, per 100 parts by weight of said monomeric material, of a water-soluble lignosulfonate alkali metal or alkaline earth metal salt as an emulsion polymerization modifier and from 0.5 to 1.5 parts, per 100 parts by weight of said monomers, of a different anionic principal emulsifying agent, resulting in a stable rubber latex having a particle size of from 1,000 to 3,000 Angstroms average diameter as determined by turbidity measurement.

17. The process of claim 16, wherein said carboxylic acid is itaconic acid.

18. The process of claim 16, wherein said monomeric material is a mixture of butadiene, styrene, and itaconic acid.

19. The process of claim 16, wherein said anionic principal emulsifying agent is sodium dodecylbenzenesulfonate.

20. A stable large particle size latex resulting from the process of claim 1.

* * * * *